Sept. 4, 1956     D. G. RENNO     2,761,729
WINDOW ASSEMBLY FOR VEHICLE BODIES
Filed April 12, 1954     3 Sheets-Sheet 1

INVENTOR.
DONALD G. RENNO
BY
Whittemore, Hulbert & Belknap
ATTORNEYS

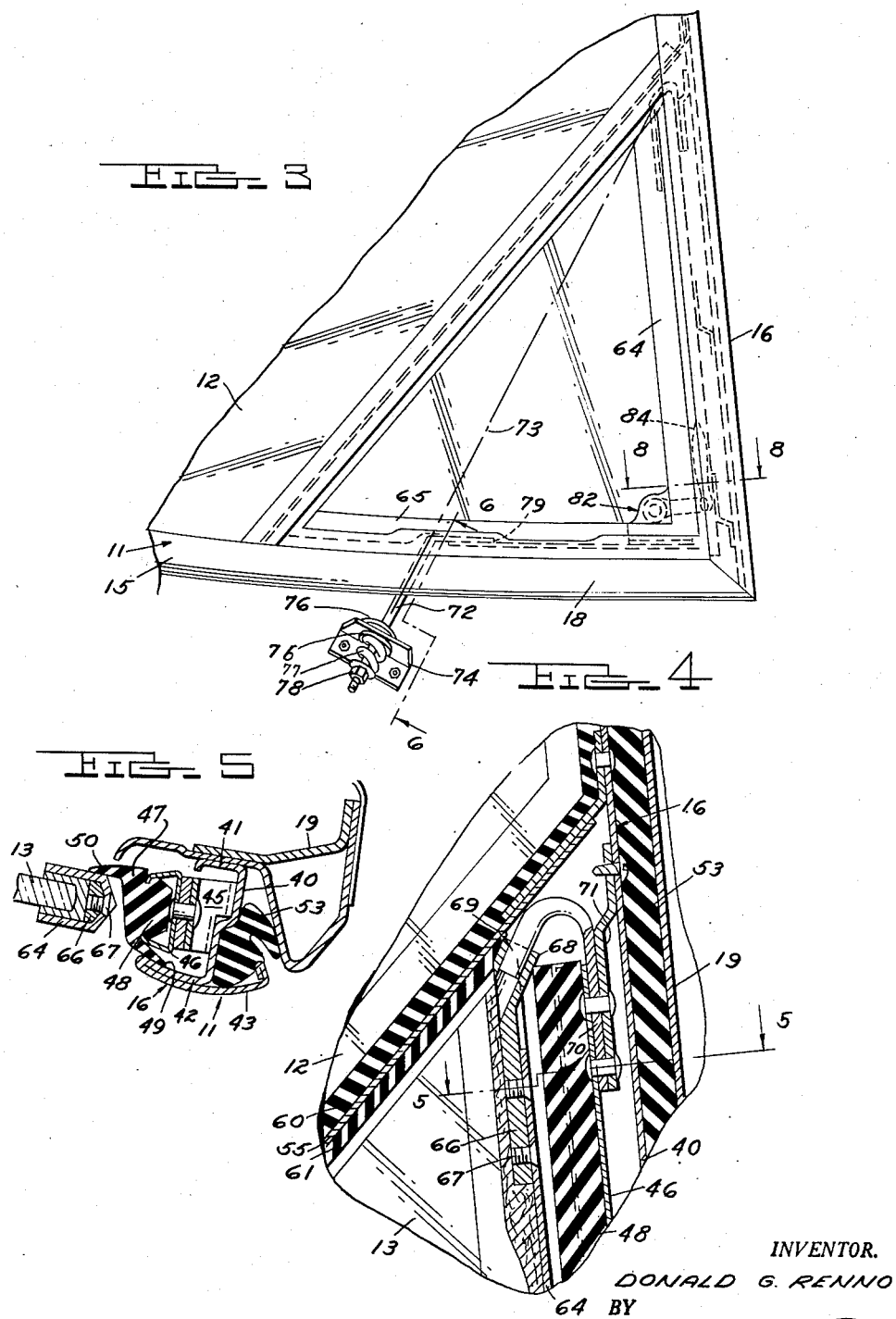

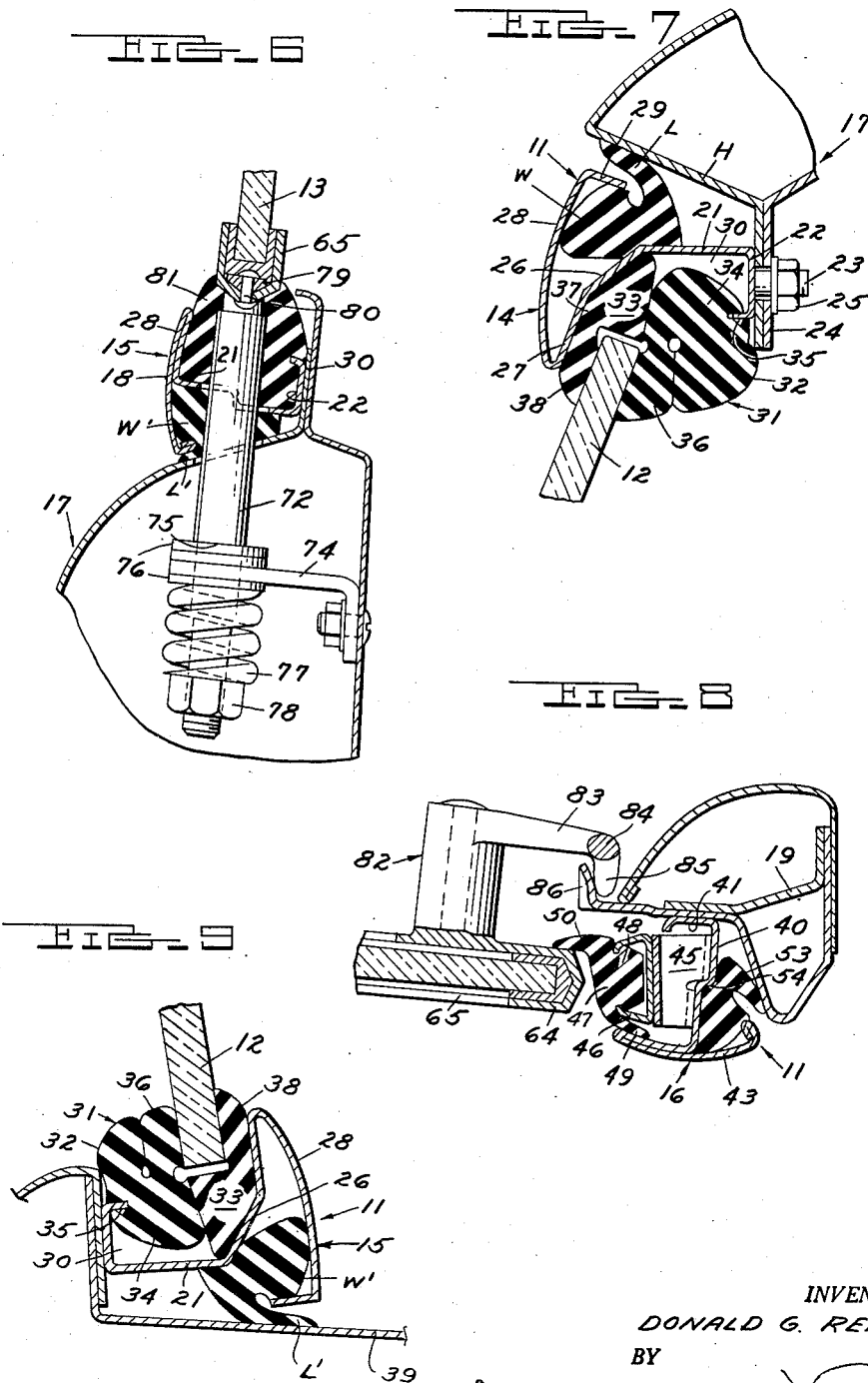

United States Patent Office 2,761,729
Patented Sept. 4, 1956

2,761,729
WINDOW ASSEMBLY FOR VEHICLE BODIES

Donald G. Renno, Birmingham, Mich., assignor to Motor Products Corporation, Detroit, Mich., a corporation of New York Application April 12, 1954, Serial No. 422,409

2 Claims. (Cl. 296—84)

This invention relates generally to window assemblies for vehicle bodies and refers more particularly to improvements in windshield or back-light window assemblies of the so-called "wrap-around" type.

It is an object of this invention to provide a vehicle body window structure comprising a frame having provision for supporting a main window panel extending transversely of a vehicle body at one end of the latter and having means extending along opposite sides of the body for supporting ventilator window panels.

It is another object of this invention to provide a window structure of the above type wherein the frame together with the various window panels form an assembly capable of being installed as a unit on a vehicle body. As a result, either or both the windshield and back light of a vehicle body together with adjacent ventilator panels may be in the form of a bench assembly and installed as a unit on the body at a remote location, if desired.

The foregoing as well as other objects will be made more apparent as this description proceeds especially when considered in connection with the accompanying drawings wherein:

Figure 3 is a fragmentary side elevational view of the window assembly shown in Figure 1;

Figure 4 is a fragmentary sectional view of a part of the window assembly shown in Figure 3;

Figure 5 is a cross sectional view taken substantially on the line 5—5 of Figure 4;

Figure 6 is a sectional view taken on the line 6—6 of Figure 3;

Figure 7 is a sectional view taken on the line 7—7 of Figure 1;

Figure 8 is a sectional view taken on the line 8—8 of Figure 3; and

Figure 9 is a sectional view taken on the line 9—9 of Figure 1.

Figure 1:
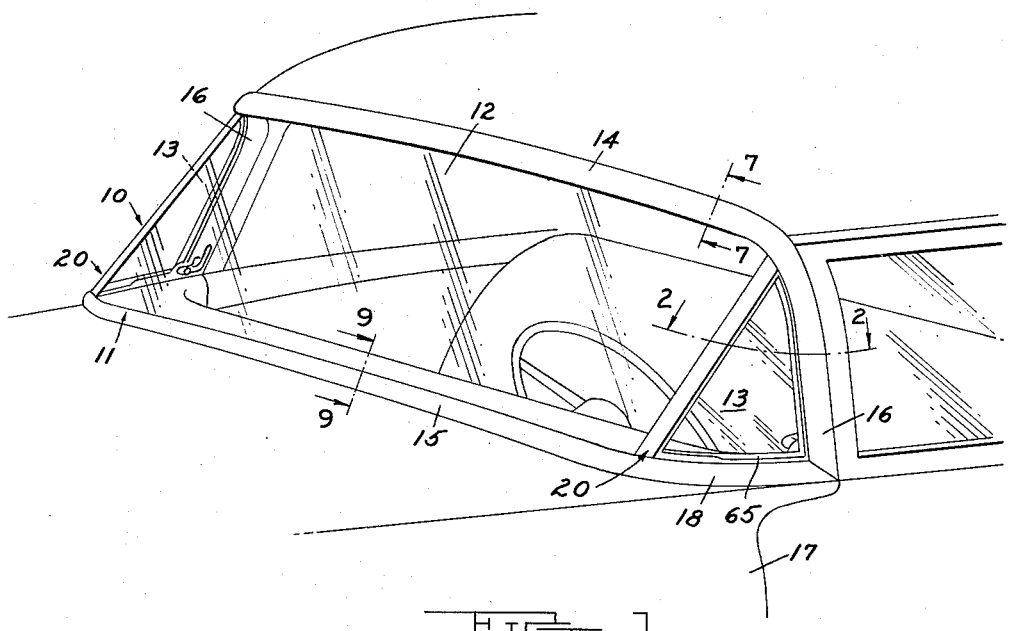
Figure 1 is a fragmentary perspective view of a part of a motor vehicle body having a window assembly constructed in accordance with the present invention.

The window assembly forming the subject matter of this invention may be installed at either or both ends of a vehicle body to form either or both the windshield and back light of the body. For the purpose of illustration, the window assembly is shown as installed on a vehicle body at the front end of the latter to provide both the windshield and the ventilator windows at opposite sides of the body.

In the several figures of the drawings, the numeral 10 designates a window assembly comprising a frame 11, a main window panel 12, and ventilator panels 13. The frame 11 is formed of sheet metal sections or bars rolled or otherwise fashioned to the desired contour. In detail, the frame 11 comprises a top bar 14, a bottom bar 15, and end bars 16.

When the frame 11 is installed on a vehicle body designated generally by the numeral 17, the top and bottom bars extend transversely of the vehicle body in substantial parallel relationship. However, the top bar 14 of the frame 11 is offset in a rearward direction relative to the bottom bar 15 and the latter has portions 18 at opposite ends which are curved in a rearward direction in a manner to respectively extend along opposite sides of the body 17. As illustrated, the rear ends of the portions 18 respectively overlie the front door pillars 19 at opposite sides of the body 17 and the portions of the door pillars extending above the belt line of the body are offset in a rearward direction to provide clearance spaces for accommodating the ventilator panels 13.

The rear ends of the curved portions 18 are respectively terminally secured to the lower ends of the end bars 16 which extend upwardly in overlying relationship to the pillars 19 and are integrally joined at the top to opposite ends of the top frame bar 14. Suitable division bars 20 are respectively secured at their lower ends to the bottom bar 15 at the junctions of the portions 18 with the bottom bar 15 and are respectively secured at the upper ends to opposite ends of the top frame bar 14. The division bars 20 cooperate with the top and bottom bars of the frame to form an opening for the main window panel 12, and also cooperate with the rearwardly curved end portions 18 of the bottom bar 15 and with the end bars 16 of the frame 11 to provide triangularly shaped openings for respectively receiving the ventilator panels 13. The above arrangement is such that the main window panel 12 extends for substantially the full width of the body 17 and the ventilator panels 13 respectively extend along opposite sides of the body 17. The division bars 20 are relatively narrow and the entire assembly is curved transversely of the body 17 to assure maximum visibility.

The cross sectional contour of the top bar 14 of the frame 11 is shown in Figure 7 of the drawings. In detail, the bar 14 has a base 21 extending for the full length of the bar and the rear edge of the base is turned downwardly to provide a depending flange 22. Suitable studs 23 are welded or otherwise secured to the flange 22 at points spaced from each other lengthwise of the bar 14 and project rearwardly through the structure 24 at the top of the body 17. Clamping nuts 25 are threadably mounted on the rear ends of the studs 23 and cooperate with the body structure 24 to secure the top frame bar 14 in place.

The front edge of the base 21 is inclined forwardly and downwardly to provide a tapered seat 26, and is then turned in a downward direction from the front edge of the seat 26 to provide a depending flange 27. The inner or bottom edge of the flange 27 is turned in an upward direction to provide a flange 28 which extends above the base 21 and is turned rearwardly to provide a terminal flange 29. The flange 28 is transversely bowed in a forward direction and provides a finish molding at the top of the frame 11. The flange 29 cooperates with the flange 28 and with the base 21 to retain a length of resilient weatherstripping W in position on the top frame bar 14. The weatherstripping W has a longitudinally extending lip L for yieldably engaging the adjacent surface of the vehicle body header H when the window assembly 10 is installed on the vehicle body.

The tapered seat 26 and the flange 27 cooperate with the flange 22 to form a downwardly opening channel 30 for receiving suitable weatherstripping 31 of resilient material. The weatherstripping 31 comprises two sections 32 and 33 which extend for the full length of the top bar 14. The section 32 has a base portion 34 which projects upwardly into the retaining channel 30 and is recessed to receive a terminal flange 35 projecting forwardly from the bottom edge of the flange 22. In addition, the section 32 has a lip 36 depending from the base 34 and frictionally engageable with the rear side of the window panel 12 adjacent the top edge of the latter. The section 33 has a base portion 37 which is wedged between the front side of the base 34 of the section 32 and the adjacent surfaces of the tapered seat 26 and flange 27. Also, the section 33 has a lip 38 depending from the base 37 along the rear face of the flange 27 and frictionally engageable with the front surface of the panel 12 adjacent the top edge of the latter.

Referring now to Figure 9 of the drawings, it will be noted that the bottom frame bar 15 is similar in cross section to the top frame bar 14 and corresponding parts are designated by the same reference numerals. It will of course be understood that the bottom frame bar 15 is inverted with respect to the frame bar 14 so that the retaining channel 30 opens upwardly to receive weatherstripping which may be and preferably is identical to the weatherstripping 31 previously described. Hence, the same reference numerals are used to indicate corresponding parts of the weatherstripping installed in the bottom frame bar 15 and it will be noted that the weatherstripping on the bottom bar 15 yieldably grips the bottom edge of the window panel 12. It will be understood from the foregoing that the weatherstripping 31 carried by the bottom frame bar 15 extends from one division bar 20 to the other in order to grip the panel 12 throughout its length. It will further be noted from Figure 9 of the drawing that the studs 23 on the bottom frame bar 15 are secured to the adjacent cowl bar 39 of the body structure by the clamping nuts 25. The space between the bottom frame bar 15 and the adjacent body structure which exists when the window assembly 10 is installed is weathersealed by a resilient strip W' identical in cross section to the weatherstrip W. The strip W' is retained in assembled relationship with the bottom frame bar 15 by the coaction of the flange 29 with the flange 28 and the base portion 21 of the bottom frame bar. Also, the strip W' has a lip L' which is clamped between the flange 29 and the adjacent body structure to provide the desired weatherseal.

Figure 2:
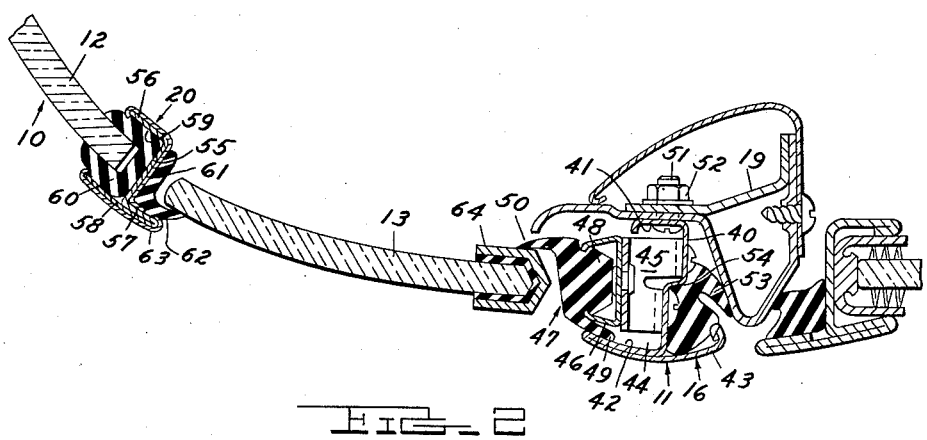
Figure 2 is a sectional view taken on the line 2—2 of Figure 1.

The end frame bars 16 are identical in construction and a description of one of these bars will suffice for both. As shown in Figures 2 and 5 of the drawings, each end bar 16 comprises a vertical web 40 having the inner edge turned laterally forwardly to provide an attaching flange 41 and having the outer edge turned in a forward direction to provide a flange 42. The flange 42 is bent back upon itself and projects rearwardly beyond the web 40 to provide a flange 43 which is transversely curved and forms in effect a continuation of the molding flange 28 on the top bar 14 of the frame. In fact, the end bars 16 may be formed integral with the top frame bar 14 or they may be formed separately from the bar 14 and welded to the latter.

The flanges 41 and 42 cooperate with the web 40 of each end bar 16 to provide a channel 44 which opens forwardly or towards the ventilator panel openings in the frame 11. Extending lengthwise of the channel 44 of each end bar 16 and secured to the web 40 is a strip 45. The strip 45 is spaced forwardly from the web 40 and supports a channel-shaped retainer 46 having the base portion riveted or otherwise secured to the strip 45 and having the flanges projecting forwardly. Extending along the channel 46 is a weathersealing strip 47 having a base portion 48 projecting into the retaining channel 46 and secured relative to the channel 46 by the side flanges of the latter.

The weathersealing strip 47 has a resilient lip 49 which is held under compression against the inner side of the flange 44 adjacent the front edge of the latter and has a second resilient lip 50 which projects into the adjacent ventilator opening of the frame 11. The lips 50 on the weatherstrips 47 carried by the end frame bars 16 are positioned to respectively yieldably engage the inner sides of the ventilator panels 13 adjacent the rear edges of these panels when they are in their relatively closed positions, as shown in Figure 2 of the drawings.

The end bars 16 are respectively secured to the door pillars 19 of the body by studs 51 (Fig. 2) secured to the flanges 41 at points spaced from each other lengthwise of the end bars 16 and projecting through openings formed in the adjacent door pillars 19. Clamping nuts 52 are respectively threadably mounted on the inner ends of the studs 51 and cooperate with the adjacent portions of the door pillars 19 to clamp the end bars 16 of the frame in place. Referring again to Figure 2 of the drawings, it will be noted that weatherstrips 53 are respectively positioned between the webs 40 of the end frame bars 16 and adjacent surfaces of the door pillars 19. The weatherstrips 53 are substantially concealed by the rear edge portions of the flanges 43 and are held in place by the coaction of the flanges 43 with suitable shoulders 54 respectively formed on the web portions 40 of the end bars 16.

The division bars 20 are also identical in construction and a description of one will suffice for both. As shown in Figure 2 of the drawings, each division bar comprises a web section 55 extending between adjacent edges of the window panels 12 and ventilator panels 13. The web 55 is turned forwardly at its inner edge to provide a flange 56 and is turned rearwardly at its outer edge to provide a flange 57. The flange 57 is turned forwardly to provide a flange 58 which extends forwardly beyond the web 55 in a manner to cooperate with the flange 56 in forming a forwardly opening channel 59. Secured within the channel 59 is a resilient strip 60 channel-shaped in cross section and opening forwardly to receive the adjacent rear edge of the window panel 12. Thus, the resilient channel-shaped strips 60 on the respective division bars 20 cooperate with the weatherstripping 31 on the respective top and bottom bars of the frame 11 to yieldably but firmly support the window panel 12. A weatherstrip 61 is secured to the rear face of the web 55 of each division bar 20 and is provided with a rearwardly extending lip 62 at the outer edge. The lips 62 are respectively embraced by the flanges 57 on the division bars 20 and engage the outer sides of the ventilator panels 13 adjacent the front edges of these panels when the latter are in their relatively closed positions. If desired, the flanges 58 on the division bars 20 may be covered with strips of bright metal 63 to impart a finished appearance to the assembly.

It has previously been stated that the frame 11 together with the window panel 12 and ventilator panels 13 are curved transversely of the vehicle body to provide what is commonly known to the trade as a "wraparound" effect. The ventilator panels 13 are located at opposite sides of the body and are curved in a manner such that when they are in their relatively closed positions they form in effect continuations of opposite ends of the window panel 12. However, the ventilator panels 13 are supported on the frame 11 for swinging movement about substantially vertically extending axes respectively located between the front and rear edges of the ventilator panels. In detail, each ventilator panel 13 has a channel-shaped frame bar 64 (Fig. 2) secured to the rear edge thereof for engagement with the weathersealing lip 50 on the adjacent strip 47, and has a similar channel-shaped frame bar 65 (Fig. 6) secured to the bottom edge thereof. The upper end of the channel-shaped member 64 at the rear edge of each ventilator panel 13 is increased in depth (Figures 4 and 5) to accommodate a bracket 66 secured to the base of the channel-shaped member 64 by screws 67 and having a socket 68 at the top of the member 64 forming a journal for a pivot pin 69. The pivot pin 69 extends downwardly from the upper end of a suitable plate 70 and the latter is secured to the web 40 of the end frame bar 16 by a bracket 71.

The bottom frame bars 65 on the ventilator panels 13 are respectively pivotally supported on the rearwardly curved end portions 18 of the bottom frame bar 15 by pins 72 located intermediate the front and rear edges of the ventilator panels 13 with their axes respectively aligned with the axes of the pivot pins 69. The construction is such that the ventilator panels 13 may be swung about substantially vertically extending axes indicated in Figure 3 of the drawings by the numeral 73.

As shown in Figure 6 of the drawings, the lower ends of the pivot pins 72 are respectively rotatably supported on brackets 74 located between the inner and outer body panels. The brackets 74 are secured to the inner panels and have openings therethrough for respectively receiving the lower ends of the pivot pins 72. The lower ends of the pivot pins 72 are reduced in diameter to provide annular shoulders 75 on the pins above the brackets 74 and friction washers 76 are mounted on the reduced portions of the pivot pins 72 at opposite sides of the brackets 74. Cooperating with the shoulders 75 on the respective pivot pins 72 to maintain the washers 76 in frictional contact with the brackets 74 are coil springs 77 and clamping nuts 78 threadably mounted on the lower ends of the pins 72. The upper ends of the coil springs engage the washers 76 at the undersides of the brackets 74 and the lower ends of the coil springs respectively seat on the nuts 78.

The pivot pins 72 project upwardly through aligned clearance openings respectively formed in the adjacent portions of the outer body panels, sealing strips W' and the ends 18 of the bottom bar 15 of the frame 11. The upper ends of the pivot pins 72 have projections 79 which extend at right angles to the pins 72 and which project through suitable openings formed in the base portions of the bottom frame members 65 of the respective ventilator panels. The projections 79 extend along the base portions of the members 65 and are respectively secured to the members 65 to form a unit with the latter by fastener elements 80. Any suitable weathersealing means may be provided on the end portions 18 of the bottom frame bar 15 for sealing the space between the end portions 18 and adjacent bottom frame members 65 when the ventilator panels 13 are in their closed positions. In the present instance, resilient strips 81 are respectively supported within the channels 30 of the portions 18 and are shaped at the top edges thereof to respectively resiliently engage the frame members 65 at the bottom edges of the ventilator panels when the latter are in their closed positions. The strips 81 are shown in Figure 6 of the drawings as apertured to respectively receive the pivot pins 72.

Any suitable means may also be provided for latching the ventilator panels 13 in their closed positions. Briefly, a crank type latch 82 is shown in Figure 8 of the drawings as rotatably supported on the frame members 64 and 65 at the inner side of each ventilator panel 13. The latches 82 have arms 83 provided with handles 84 and cams 85 positioned to respectively engage cam surfaces 86 on the adjacent door pillars 19. The arrangement is such that upward swinging movement of the handles 84 releases the cams 85 from the adjacent cam surfaces 86 and permits the ventilator panels 13 to be swung about their respective axes 73. It will be apparent from Figure 2 of the drawings that when the ventilator panels are swung to their open positions, the rear edges swing outwardly and the front edges swing inwardly in accordance with conventional practice to obtain proper circulation of air for efficient ventilation of the interior of the vehicle body.

From the foregoing description, it will be understood that the frame structure 11, main window panel 12, ventilator panels 13, pivotal mountings for the ventilator panels, sealing means for the aforesaid panels, and the sealing means for the frame all form an assembly capable of being installed as a unit on the vehicle body. Such an arrangement not only greatly facilitates final assembly of the body but, in addition, minimizes breakage of the panels during installation and improves the general appearance of the body.

What I claim as my invention is:

1. In a window structure, a frame for a window panel having a bar provided with a web and side flanges projecting from said web, one of said side flanges being attachable to a vehicle body structure, the other of said flanges having a return-bent transversely bowed flange constituting a finish molding and having a terminal flange projecting toward said web whereby weatherstripping engageable with said vehicle body structure may be held between said terminal flange and web, a metal strip between said side flanges and secured to said web, and means carried by said metal strip for holding weatherstripping engageable with the other of said side flanges and with a ventilator panel.

2. In a window structure, a frame for a window panel having a bar provided with a web and side flanges projecting from said web, one of said side flanges being attachable to a vehicle body structure, the other of said flanges having a return-bent transversely bowed flange constituting a finish molding and having a terminal flange projecting toward said web whereby weatherstripping engageable with said vehicle body structure may be held between said terminal flange and web, a bracket secured to said web, a plate secured to said bracket, and a pivot pin for a ventilator panel projecting from said plate.

References Cited in the file of this patent
UNITED STATES PATENTS

| | | |
|---|---|---|
| D. 162,136 | Earl | Feb. 27, 1951 |
| D. 167,906 | Muller | Oct. 7, 1952 |
| 1,646,743 | Bernard | Oct. 25, 1927 |
| 1,761,161 | Thomas | June 3, 1930 |
| 2,171,191 | Potter | Aug. 29, 1939 |
| 2,437,664 | Hicks | Mar. 9, 1948 |
| 2,464,696 | Lelong | Mar. 15, 1949 |
| 2,606,635 | Clingman | Aug. 12, 1952 |